US006970577B2

(12) United States Patent
Han

(10) Patent No.: US 6,970,577 B2
(45) Date of Patent: Nov. 29, 2005

(54) FAST FOURIER TRANSFORM CORRELATION TRACKING ALGORITHM WITH BACKGROUND CORRECTION

(75) Inventor: Ruey-Yuan Han, Winter Park, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 470 days.

(21) Appl. No.: 09/739,002

(22) Filed: Dec. 19, 2000

(65) Prior Publication Data

US 2005/0163341 A1    Jul. 28, 2005

(51) Int. Cl.[7] .............................................. G06K 9/00
(52) U.S. Cl. ....................... 382/103; 382/280; 348/169
(58) Field of Search .......................... 382/103, 236, 382/248, 280, 278; 244/3.15, 3.17; 375/240.16; 348/169, 699

(56) References Cited

U.S. PATENT DOCUMENTS

| | | | |
|---|---|---|---|
| 4,471,357 A | | 9/1984 | Wu et al. |
| 4,549,184 A | | 10/1985 | Boles et al. |
| 5,150,426 A | | 9/1992 | Banh et al. |
| 5,245,347 A | | 9/1993 | Bonta et al. |
| 5,524,845 A | * | 6/1996 | Sims et al. ................. 244/3.17 |
| 5,546,085 A | | 8/1996 | Garnaat et al. |
| 5,694,131 A | | 12/1997 | Baggett et al. |
| 5,703,970 A | * | 12/1997 | Atashroo .................... 382/278 |
| 5,812,082 A | | 9/1998 | Moreira et al. |
| 6,625,216 B1 | * | 9/2003 | Zhu ....................... 375/240.16 |

* cited by examiner

Primary Examiner—Jon Chang
Assistant Examiner—Charles Kim
(74) Attorney, Agent, or Firm—Burns, Doane, Swecker & Mathis LLP

(57) ABSTRACT

An FFT correlation tracker that is capable of effectively tracking targets against non-uniform backgrounds in real-time, includes a background correction implemented using a FFT with the 2-dimension sinc function. The tracker tracks an object by effectively computing the first and third terms of the mean-square-error function C(s,t) defined as $$C(s,t) = \frac{1}{N}\sum_N f^2(x,y) + \frac{1}{N}\sum_N g^2(x-s, y-t) - 2 \cdot \frac{1}{N}\sum_N [f(x,y) \cdot g(x-s, y-t)]$$

This is done by first transforming the first and third terms into the frequency domain, where the first term, the background correction term, can be computed much more efficiently in real-time by using the 2-dimension sinc function. Multiplications and additions necessary to carry out the computations in the frequency domain are then performed. Next, the resulting frequency-domain function is transformed back into the spatial domain to form a correlation surface. Finally, a minimum of the resulting correlation surface is found. The location of the minimum corresponds to the location of the object being tracked.

8 Claims, 5 Drawing Sheets ized to find the minimum of MSE; it also works to find the maximum of the cross-correlation function between the reference and search windows.
FAST FOURIER TRANSFORM CORRELATION TRACKING ALGORITHM WITH BACKGROUND CORRECTION

BACKGROUND OF THE INVENTION

1. Field of the Invention

The present invention relates to the field of image tracking, e.g., tracking an object within an image.

2. State of the Art

Conventional image-based tracking systems, for example those used in infra-red (IR) missile-based tracking systems for guiding missiles, typically use a conventional Fast Fourier Transform (FFT) correlation tracker to track an reference image or object within an image frame. The conventional FFT correlation tracker computes a correlation function between the reference image, saved for example from previous image frames, and the current input image frame. The correlation function is computed using the FFT technique. The advantage of using an FFT technique is higher image processing speeds, particularly when large search areas in the current image frame and large reference windows are used. The conventional FFT correlation tracker performs well when tracking targets against uniform backgrounds, for example when tracking an airplane against blue sky. However, the conventional FFT correlation tracker performs poorly when tracking targets against non-uniform backgrounds, for example when tracking ground vehicles against a background of rugged terrain.

Accordingly, an urgent need exists for a tracking system that is robust, accurate and effective when tracking targets against non-uniform backgrounds. Such situations commonly arise, for example, in standard-profile combat missions flown by Apache and Comanche helicopters.

SUMMARY OF THE INVENTION

In accordance with exemplary embodiments of the invention, a new FFT correlation tracking system is provided that is robust, accurate and capable of effectively tracking targets against non-uniform backgrounds in realtime. The system includes a background correction that allows the system to provide performance that is significantly better than performance of the conventional FFT correlation tracker. In accordance with exemplary embodiments of the invention, the background correction is implemented using an FFT with the 2-dimension sinc function.

BRIEF DESCRIPTION OF THE DRAWINGS

Other objects and advantages of the present invention will become apparent to those skilled in the art from the following detailed description of preferred embodiments, when read in conjunction with the accompanying drawings. Like elements have been designated with like reference numerals.

DETAILED DESCRIPTION OF THE INVENTION

Figure 1:
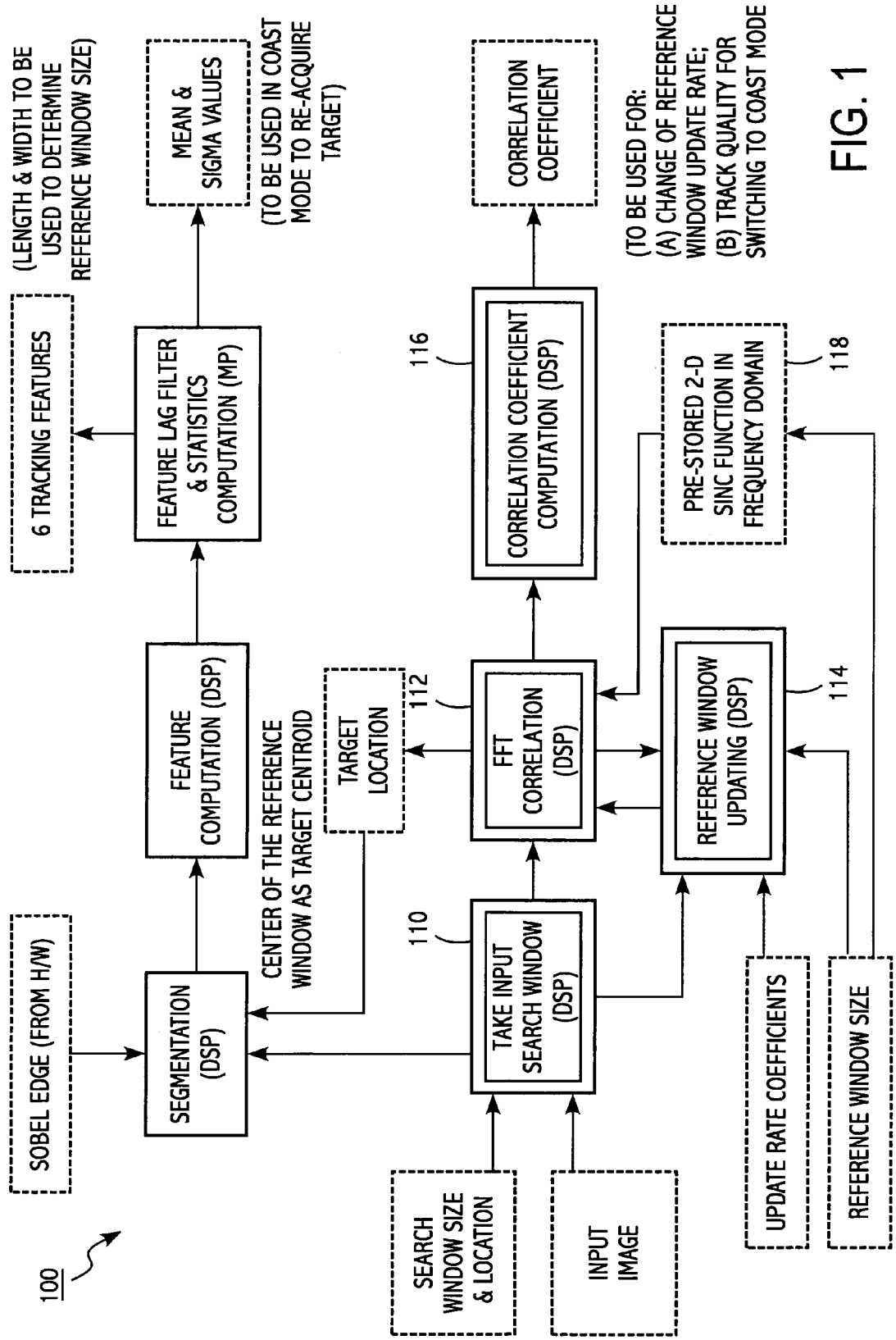
FIG. 1 shows a tracking system that incorporates an FFT correlation tracker in accordance with exemplary embodiments of the invention.

FIG. 1 shows a tracking system 100 that incorporates an FFT correlation tracker in accordance with exemplary embodiments of the invention. As shown in FIG. 1, the FFT correlation tracker includes a block 110 for receiving an input search window, a block 112 that performs FFT correlation in accordance with the invention, a block 116 that computes correlation coefficients, a block 114 that updates the reference window, and a block 118 that provides a pre-stored, 2 dimension sinc function in the frequency domain (a Fourier Transform of a 2 dimension gate function) for use in the FFT correlation in the block 112.

Exemplary embodiments of the new FFT correlation tracker can be used, for example, as the primary correlation-based tracker in the image-based tracking system described in copending U.S. patent application Ser. No. 09/255,781, entitled "Real-Time Multi-Stage Infrared Image-Based Tracking System", filed Feb. 23, 1999, and hereby incorporated by reference in its entirety.

Figure 3A:
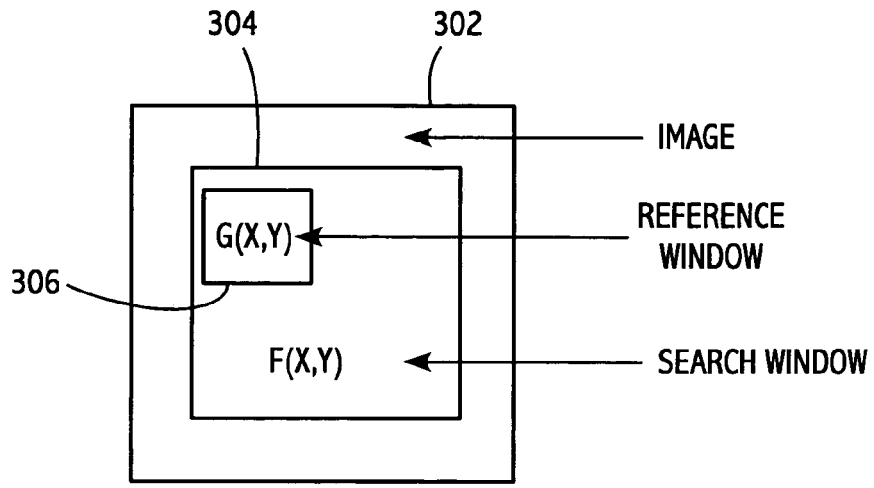
FIGS. 3A, 3B illustrate relationships between a search window and a reference window, as used in exemplary embodiments of the invention.

FIG. 3A illustrates a window structure used in exemplary embodiments of the invention. In general terms, a search window 304 contains a portion of an input image frame 302. A smaller reference window 306 contains a reference subimage corresponding to the object to be tracked. The reference window 306 is moved across the search window 304 to systematically compare the reference subimage in the reference window 306 with the portions of the input image frame 302 encompassed by the search window 304. The objective is to find a match, or in other words to locate the object within the search window, and thus track the object.

More specifically, the correlation tracker can compute the mean square error (MSE) between the rectangular reference window 306 and the larger rectangular search window 304 (where the search window 304 covers a region of pixels within the input image frame 302), to provide a measure of similarity, and then find the minimum of the MSE to locate the object. That is, when the tracking system is given a predesignated target, it is given a reference window containing an actual image of the target. For example, a helicopter pilot in a helicopter carrying a missile can look at an IR image, and designate a target within it by placing a target box around the target or by centering or otherwise designating the target using a cross hair or other aiming mechanism. The subimage within the target box, or the image area surrounding the cross hair, can be designated as the reference window image for the tracking system.

As time passes, the missile and the target can move with respect to each other, which can cause the target to move to a different location in the image. To detect this movement and correct for it, the tracking system moves the reference window 306 over the search window 304 to determine which portion of the search window 304 most closely matches the subimage in the reference window 306, and thereby determine the new location of the target in the search window 304. The portion of the search window 304 that most closely matches the subimage in the reference window 306 indicates the new location of the target, and can also become the new subimage for the reference window 306. In this way the correlation tracker can continue to recognize and track the target, such as a battle tank, even as the tank turns and presents a different outline and/or other features in the input image frame.

The coordinate origins of the input image frame 302, the search window 304, and the reference window 306 are located in the respective upper left corners of the frame and windows.

Figure 3B:
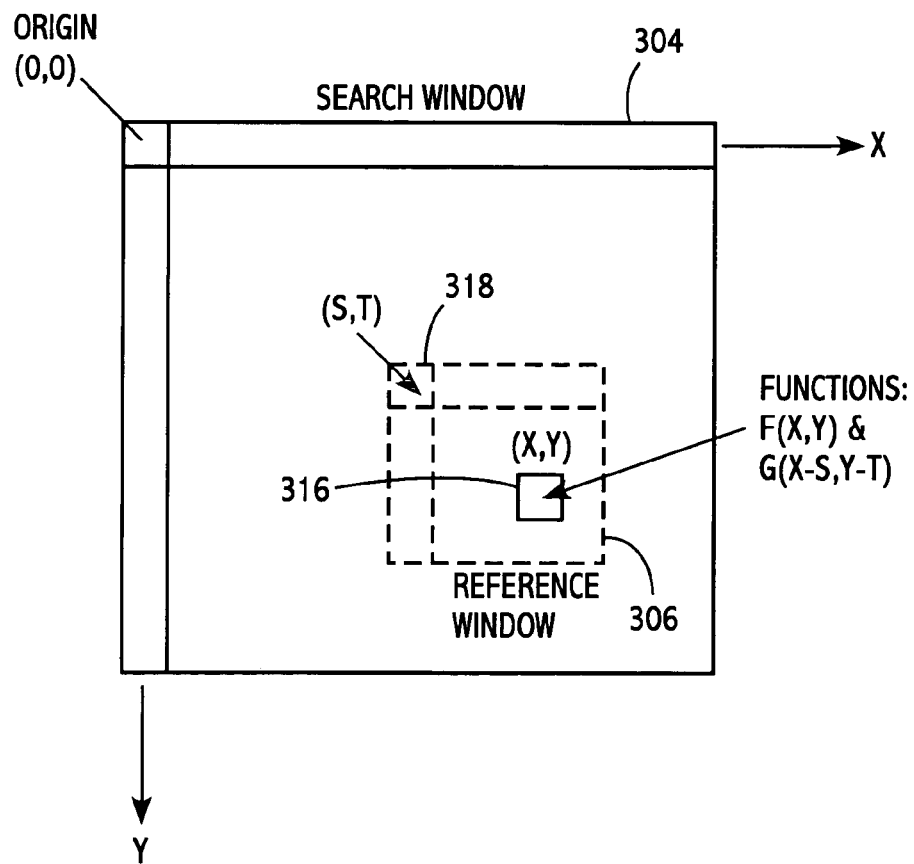

The image coordinates to be used for the follow-on mathematical description of the invention are defined in FIG. 3B, with the horizontal axis pointing to the right designated as the x axis and the vertical axis pointing downward designated as the y axis. The upper-left corner of the search window 304 is taken as the origin (0,0) of the image coordinates. The location of the reference window 306 within the search window 304 is represented by the pixel coordinates (s,t) of the upper-left corner of the reference window 306 (designated with reference 318). The image function f of the search window 304 and the image function g of the reference window 306 are individually defined with respect to the upper-left corners of their corresponding windows. The location 316 represents a particular location (x−s, y−t) within the reference window 306, at which the pixel of the reference subimage in the reference window 306 is currently being compared with the underlying pixel in the search window 304 (at the location (x,y) within the search window 304). The relevance of the functions f(x,y) and g(x−s, y−t) indicated in FIG. 3B is described in greater detail below.

In accordance with exemplary embodiments of the invention, a mathematical approach is taken that is different from that of the conventional FFT correlation tracker. In accordance with the invention, when correlating a reference window with the search area of an input image frame, a minimum mean-square-error (MMSE) method is used. This can be presented in the following equation form:

$$C(s, t) = \frac{1}{N} \sum_N [f(x, y) - g(x-s, y-t)]^2 \quad (1)$$

where:
- $f(x,y)$=the input image function within the search area 304 in the current cycle, i.e., the search window function value at the pixel location (x,y) with respect to the upper-left corner of the search window 304, i.e., the origin (0,0) of the image coordinates;
- $g(x-s,y-t)$=the image function within the reference window 306 obtained from previous cycles, or in other words, the reference window function value at the same pixel location as $f(x,y)$;
- N=the number of pixels within the reference window 306;
- (x,y)=the pixel coordinates within the search area 304, with reference to the upper-left corner of the search window 304;
- (s,t)=the pixel coordinates of the upper left corner of the reference window 306 within the search window 304;
- Σ=the summation over all pixels within the reference window 306 for a given location of the reference window 306 at (s,t).

Each time the reference window 306 is moved to a new location (s,t) within the search area 304, the summation is performed over only those pixels covered under the reference window 306. The result of this computation is a 2-dimension correlation surface C(s,t). The target location is the location where the function C(s,t) attains a minimum value.

A direct, spatial-domain implementation of Equation (1) is straightforward. However, it requires lots of processing time and cannot be used in realtime applications as a tracker, for example as a tracker for a rocket-propelled guided missile whose task is to destroy a moving target. In order to reduce processing time, an FFT approach has to be developed. Further expansion of Equation (1) leads to three terms, as shown below:

$$C(s, t) = \frac{1}{N} \sum_N f^2(x, y) + \frac{1}{N} \sum_N g^2(x-s, y-t) - 2 \cdot \frac{1}{N} [f(x, y) \cdot g(x-s, y-t)] \quad (2)$$

The first term in Equation (2) is a summation over the square of the input pixel values covered under the reference window 306 located at (s,t), which represents the total energy of the input image frame 302 covered under the reference window 306. When the background is uniform, the value of this first term is a constant. When the background is non-uniform, the value of this first term varies with the location (s,t) of the reference window 306 within the input image frame 302 or the search window 304.

The second term in Equation (2) is a summation over the reference window 306, which represents the total energy contained by the image in the reference window 306. The value of this second term is a constant, independent of the location of the reference window 306 within the input image frame 302 or the search window 304.

The third term in Equation (2) is a summation over the pixel-by-pixel products between the reference image in the reference window 306 and the corresponding portion of the search window 304 covered by the reference window 306. The summation performed in this third term is the so-called "correlation function" between the two image functions, which is the fundamental function used in the conventional FFT correlation tracker.

The search for the target location in the input image frame 302, more specifically in the search window 304, is the search for the minimum value of the function C(s,t). Since the second term in Equation (2) is a constant bias term, it has no effect in determining the location of the function minimum, and therefore can be neglected from any further consideration.

In the conventional FFT correlation tracker, the first term of Equation (2) is not used, and the minimum value of the function C(s,t) is determined using only the third term in Equation (2), which corresponds to the peak of the conventional correlation function. In this situation, the location of the correlation peak is heavily affected by background variation of the input image frame 302 within the search area or search window 304. Thus, the peak of the correlation function as computed by the conventional FFT correlation tracker, does not necessarily guarantee or reflect the true location of the target within the search area 304.

In accordance with exemplary embodiments of the invention, the first term of Equation (2) is used together with the third term of Equation (2), to determine a minimum value of the function C(s, t). The resulting correlation tracker effectively tracks target objects against varying backgrounds. Thus, exemplary embodiments of the FFT correlation tracker of the invention use an algorithm that includes both a) the third term of Equation (2), which is the cross-correlation term between the input image within the search window 304 and the reference window 306, as used in the conventional FFT correlation tracker, and b) the first term of Equation (2), which is a background correction term. This combination allows the FFT correlation tracker of the invention to accurately track target objects against varying backgrounds.

In the FFT correlation tracker of the invention, the third term in Equation (2) can be handled using the same FFT approach as in the conventional FFT tracker. Now, the question is how to implement the first term of Equation (2) in an efficient way. The best solution is to find a way to implement this term using FFT techniques. In this manner the time required for processing can be reduced. In addition, the whole processing stream can be made more coherent and more efficient when FFT techniques are applied to both of the first and third terms of Equation (2).

A careful study of the first term in Equation (2) leads to the conclusion that it is actually a convolution computation between a) the squared function of the input image within the search area 304, and b) a 2-dimension gate function which has the same size as the reference window 306. Further mathematical analysis reveals that this convolution computation is equivalent to multiplication in the frequency domain of the Fourier transform of the squared function with the 2-dimension sinc function. The 2-dimension sinc function is the frequency domain (i.e., FFT transform domain) counterpart of the (spatial domain) 2-dimension gate function.

Thus, exemplary embodiments of the FFT correlation tracker of the invention compute the first term of Equation (2), i.e., the background correction term, using FFT techniques, and specifically using the 2-dimension sinc function. This substantially reduces processing time and ensures that the FFT correlation tracker of the invention can accurately track target objects against varying or non-uniform backgrounds, in realtime.

Figure 2:
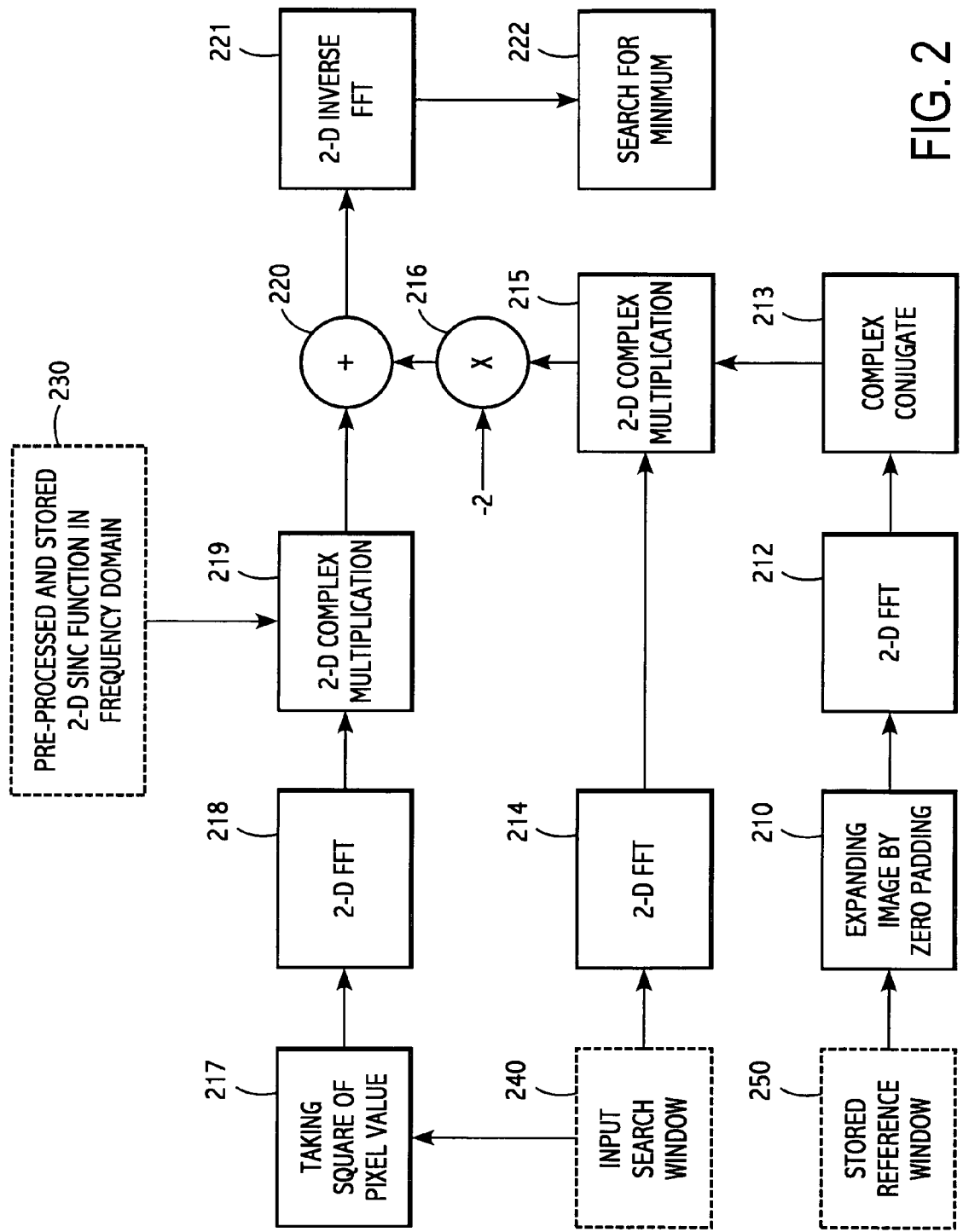
FIG. 2 shows a process performed by an FFT correlation tracker in accordance with exemplary embodiments of the invention.

FIG. 2 shows a block diagram of a process performed by an FFT correlation tracker in accordance with exemplary embodiments of the invention, in which both the first and third terms of Equation (2) are evaluated. As shown in FIG. 2, in block 240 an input search window is provided and furnished to each of blocks 214 and 217. In block 250, a stored reference window is provided. From block 250, the stored reference window is provided to block 210, where the reference window is expanded by zero padding to the size of the search window.

Figure 4:
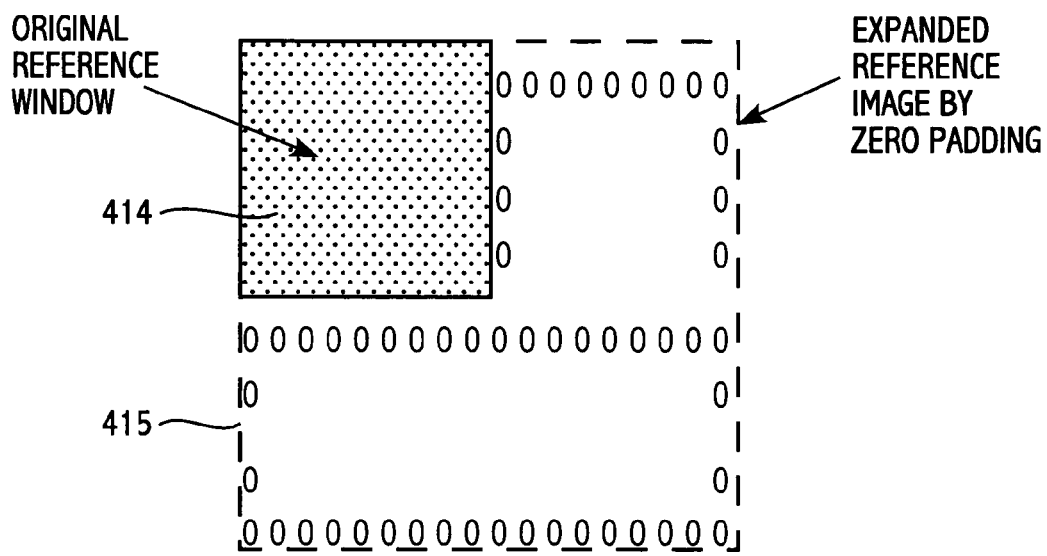
FIG. 4 illustrates creation of an expanded reference image by zero padding an original reference window, in accordance with a step of the FIG. 2 process.

FIG. 4 shows this procedure of zero padding, where an original reference window 414 is expanded on two sides using zero padding to create an expanded reference window 415. Zero padding is performed by setting values of the added pixels to zero.

Returning to FIG. 2, block 210 provides the expanded reference image to block 212, which performs a 2-dimension FFT on the expanded reference window. This is done, for example, by performing 1-dimension real FFT by rows through the whole image of the expanded reference window, thereby obtaining a complex image, and then performing 1-dimension complex FFT by columns from column 0 through column N/2 of the complex image (where N is the number of columns in the expanded reference window).

The result from block 212 is provided to block 213, which generates a complex conjugate of the result (the expanded reference image on which the 2-dimension FFT has been performed). In particular, a complex conjugate on the left half of the complex image output from block 212, from column 0 through column N/2, is obtained. The block 213 provides the complex conjugate to block 215.

As described above, the block 240 provides an input search window to the block 214. The block 214 performs a 2-dimension FFT on the input search window in the same fashion that the block 212 performs a 2-dimension FFT on the expanded reference window. In particular, block 214 first performs a 1-dimension real FFT by rows through the whole image of the input search window, thereby obtaining a complex image, and then performs a 1-dimension complex FFT by columns from column 0 through column N/2 of the complex image (where N is the number of columns in the image). The block 214 then provides the result to block 215.

Block 215 performs a 2-dimension complex multiplication of the output from block 213, with the output from block 214. This is done, for example, by performing a pixel-to-pixel multiplication between the two complex images on the left halves of the images, from column 0 of the images to column N/2 of the images. The block 215 then provides the multiplication result to block 216.

Block 216 multiplies the output from block 215, by −2, and then provides the result to block 220.

As indicated above, block 240 provides an input search window to block 217. Block 217 takes the square of pixel values of the input search window, on the whole image plane of the input search window. The resulting squared input search window image is then output from block 217 to block 218.

In block 218, a 2-dimension FFT is performed in the same fashion that the blocks 212 and 214 perform 2-dimension FFT on the expanded reference window and on the (un-squared) input search window. In particular, block 218 first performs a 1-dimension real FFT by rows through the whole image of the squared input search window, thereby obtaining a complex image, and then performs a 1-dimension complex FFT by columns from column 0 through column N/2 of the complex image (where N is the number of columns in the image). The block 218 then provides the result to block 219.

Block 230 provides a pre-processed and stored 2-dimension sinc function that is in the frequency domain, to the block 219.

In block 219, the 2-dimension sinc function from block 230 is multiplied with the FFT of the squared search window (received from block 218), via a 2-dimension complex multiplication similar to that performed in block 215. This is done, for example, by performing a pixel-to-pixel multiplication between the two images on the left halves of the images, from column 0 of the images to column N/2 of the images. The block 219 outputs the result of the multiplication to the block 220.

The block 220 adds the multiplication results output by the block 219 and the block 216, together, and then outputs the sum to the block 221.

Figure 5:
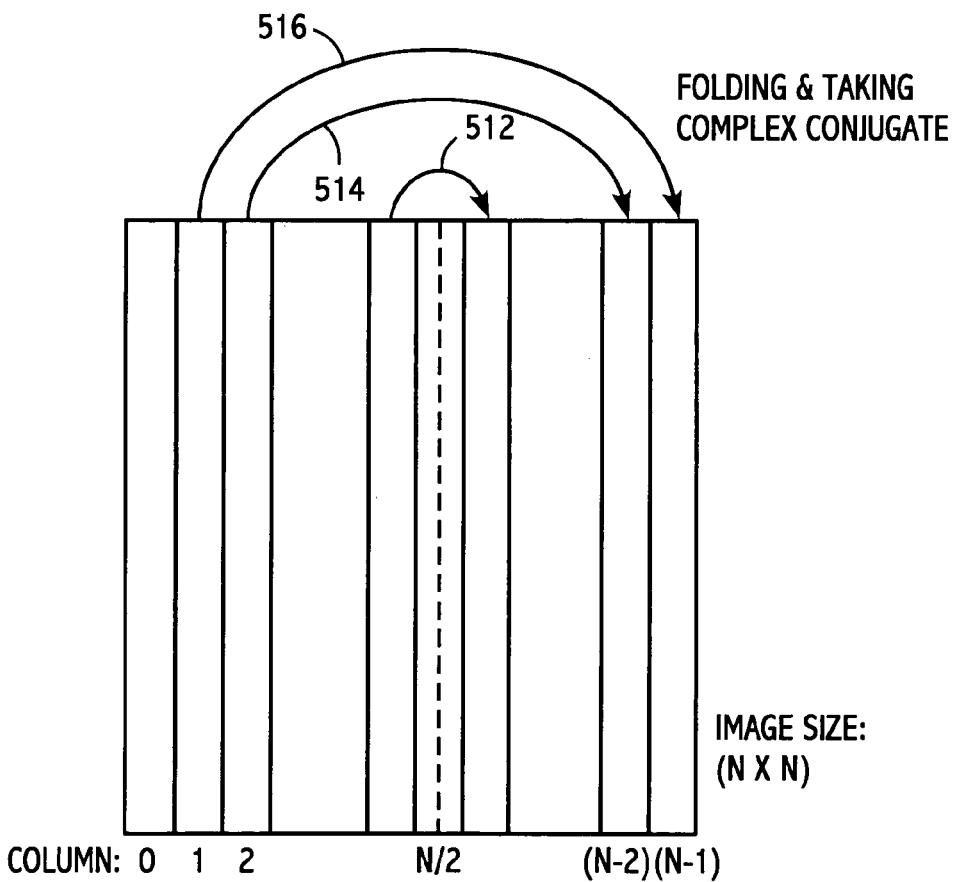
FIG. 5 illustrates a step from the FIG. 2 process, involving folding and taking a complex conjugate, in accordance with exemplary embodiments of the invention.

The block 221 performs a 2-dimension inverse FFT on the sum received from the block 220. This is done, for example, by first performing a 1-dimension complex inverse FFT by columns, from column 0 to column N/2. The resulting image with ((N/2)+1) columns is then expanded into an N-column image, by a) folding the left half image over the right half with respect to column N/2, and then b) generating the complex conjugate on the resulting right half image as shown for example in FIG. 5. As shown in FIG. 5, the columns 1, . . . (((N/2)-1) are "folded" about the column N/2 onto the right side, so that column 1 is matched with column N−1, column 2 is matched with column N-2, and so forth.

Finally, a 1-dimension complex inverse FFT is performed by rows over the whole N×N image to produce the resulting real image.

Figure 6:
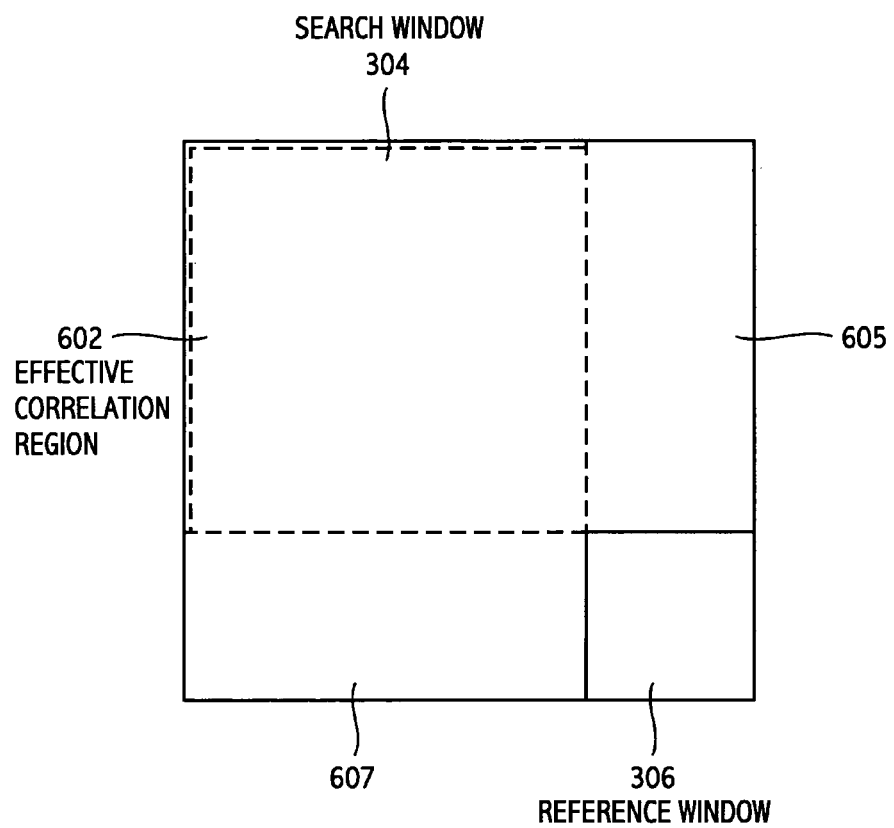
FIG. 6 shows the effective correlation region after excluding some border areas due to edge effect of window operation.

The resulting real image with a size N×N is then provided to block 222, where it is evaluated to locate a minimum value (and thereby, the location within the search window of the target object to be tracked). The search for a minimum should be limited within an effective correlation area inside the search window to avoid areas with edge effect. The effective correlation region is illustrated in FIG. 6 as the effective correlation region 602 enclosed within dashed lines. Areas within the search window 304 that lie outside the effective correlation region 602 are excluded due to edge effect. As shown in FIG. 6, the border areas excluded due to edge effect include the two rectangular areas 605, 607 on the right and on the bottom of the search window 304, each having a length equal to the dimension of the search window 304 and a width equal to that of the reference window 306. The border areas excluded due to edge effect also include the region at the lower right corner of the search window 304, enclosed within the reference window 306 as located in FIG. 6.

The relationship of the 2-dimension sinc function to the process of the invention can also be described in a more mathematically precise fashion, as follows:

$$\sum_N f^2(x, y) = \sum_{-\infty}^{\infty} [f^2(x, y) \cdot h(x - s, y - t)] \qquad (3)$$

where the left side of Equation (3) is the same as the first term of Equation (2) with the constant factor (1/N) dropped, and is performed over the reference window 306 located at (s,t);

the right side of Equation (3) is a correlation between $f^2(x,y)$ and $h(x,y)$; and h(x−s, y−t) is the 2-dimension gate function with a value of 1 over the area of the reference window 306 located at (s,t), and with a value of 0 elsewhere.

If we let $r(x,y)=f^2(x,y)$, then the right side of Equation (3) becomes:

$$\sum_{-\infty}^{\infty} [r(x, y) \cdot h(x - s, y - t)] \qquad (4)$$

which is a correlation between r(x,y) and h(x,y).

The Fourier Transform of Equation (4) is the multiplication between two functions in the frequency domain, $$R(f_x,f_y) \cdot H^*(f_x,f_y) \qquad (5)$$

$$= R(f_x,f_y) \cdot H(f_x,f_y) \qquad (6)$$

where $R(f_x,f_y)$ is the Fourier transform of r(x,y),
$H^*(f_x,f_y)$ is the complex conjugate of $H(f_x,f_y)$, and
$H(f_x,f_y)$ is the 2-dimension sinc function, which is a real function.

Thus, the Fourier Transform of the right side of Equation (2) with the second term omitted and the constant factor (1/N) dropped, can be represented as:

$$R(f_x,f_y) \cdot H(f_x,f_y) - 2[F(f_x,f_y) \cdot G^*(f_x,f_y)] \qquad (7)$$

where $F(f_x,f_y)$ is the Fourier Transform of f(x,y), the image function of the search window 304, and $G^*(f_x,f_y)$ is the complex conjugate of the Fourier Transform of g(x,y), the image function of the reference window 306.

After performing Fourier Transforms of r(x,y), h(x,y), f(x,y) and g(x,y) and the frequency-domain operations shown in Equation (7), an inverse Fourier Transform can be applied to yield the 2-dimensional correlation surface C(x, y), which can then be evaluated to find a minimum on the correlation surface, which corresponds to the location of the target object in the search window 304.

Those of ordinary skill in the art will recognize that the tracking system 100 can be implemented using any appropriate microprocessor(s), computer(s), computing machine(s) or combination thereof.

For example, the blocks 110, 112, 114, 116, and others in FIG. 1 can be implemented using one or more Digital Signal Processors (DSPs), computers, microprocessors, or other appropriate devices.

For example, the correlation tracker of the present invention can be implemented using the set 204 of quad floating point DSPs in conjunction with the master processor 202 and the frame memory set 206, as shown in FIG. 2 of copending application Ser. No. 09/255,781. Of course, any number of DSPs can be used, provided adequate processing power to implement the functionality described herein is available.

In accordance with an exemplary embodiment of the invention, under the direction of the master processor 202, the set 204 of DSPs run software that performs the correlation-based tracking functions and can also perform feature-based tracking functions in, for example, a transparent multi-tasking or time-sharing fashion. As those skilled in the art will recognize, the software routines for the correlation-based tracking functions of the present invention, and/or feature-based tracking functions as disclosed in copending application Ser. No. 09/255,781, can be appropriately compiled for execution on a variety of different hardware platforms.

In summary, those of ordinary skill in the art will recognize that the particular hardware or hardware platform used to perform the functions of the correlation tracker of the present invention, can be appropriately selected and configured to be transparent to the overall tracking system.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for tracking an object in an image using Fast Fourier Transforms, comprising:
   identifying a background correction term for a Fast Fourier Transform correlation tracker; and
   tracking the object based on a representation of the background correction term that includes a frequency domain sinc function;
   wherein the tracking includes zero-padding a reference window to a size of a search window, performing a 2 dimension Fast Fourier Transform of the zero-padded reference window into the frequency domain, and taking a complex conjugate of the transformed zero-padded reference window, performing a 2 dimension Fast Fourier Transform of a search window, performing a complex multiplication of the complex conjugate of the transformed zero-padded reference window and the transformed search window, and multiplying the result by a first factor to obtain a first result in the frequency domain, squaring pixel values of the search window and performing a 2 dimension Fast Fourier Transform of the squared pixel values into the frequency domain, multiplying the transform of the squared pixel values with a sinc function to obtain a second result in the frequency domain, summing the first and second results to form a third result in the frequency domain, performing a 2 dimension inverse Fast Fourier Transform of the third result to obtain a spatial-domain correlation surface, and searching for a minimum of the correlation surface.

2. The method of claim 1, wherein the first factor is −2.

3. The method of claim 1, wherein the sinc function is a 2 dimension sinc function.

4. The method of claim 3, wherein the sinc function is pre-stored.

5. The method of claim 1, wherein in the step of searching for a minimum of the correlation surface, border areas which have edge effect caused by window operation, are excluded.

6. A method for tracking an object in an image using Fast Fourier Transforms, comprising:
   identifying a background correction term for a Fast Fourier Transform correlation tracker; and
   tracking the object based on a representation of the background correction term that includes a frequency domain sinc function;
   wherein the tracking includes zero-padding a reference window to a size of a search window, performing a 2 dimension Fast Fourier Transform of the zero-padded reference window into the frequency domain, and taking a complex conjugate of the transformed zero-padded reference window, performing a 2 dimension Fast Fourier Transform of a search window, performing a complex multiplication of the complex conjugate of the transformed zero-padded reference window and the transformed search window, and multiplying the result by a first factor to obtain a first result in the frequency domain, obtaining a search window function by squaring pixel values of the search window, performing a 2 dimension Fast Fourier Transform of the search window function into the frequency domain, multiplying the transform of the search window function with a sinc function to obtain a second result in the frequency domain, summing the first and second results to form a third result in the frequency domain, performing a 2 dimension inverse Fast Fourier Transform of the third result to obtain a spatial-domain correlation surface, and searching for a minimum of the correlation surface.

7. A Fast Fourier Transform correlation tracker, comprising:
   a computing device with inputs for receiving an input search window image and receiving a reference window image, wherein the computing device tracks the reference window image in the input search window image based on a frequency domain background correction term that includes a 2 dimension sinc function, wherein the tracker:
   zero-pads a reference window to a size of a search window, performs a 2 dimension Fast Fourier Transform of the zero-padded reference window into the frequency domain, and takes a complex conjugate of the transformed zero-padded reference window;
   performs a 2 dimension Fast Fourier Transform of a search window;
   performs a complex multiplication of the complex conjugate of the transformed zero-padded reference window and the transformed search window, and multiplies the result by a first factor to obtain a first result in the frequency domain;
   squares pixel values of the search window and performs a 2 dimension Fast Fourier Transform of the squared pixel values into the frequency domain;
   multiplies the transform of the squared pixel values with a sinc function to obtain a second result in the frequency domain;
   sums the first and second results to form a third result in the frequency domain;
   performs a 2 dimension inverse Fast Fourier Transform of the third result to obtain a spatial-domain correlation surface; and
   searches for a minimum of the correlation surface.

8. A Fast Fourier Transform correlation tracker, comprising:
   a computing device with inputs for receiving an input search window image and receiving a reference window image, wherein the computing device tracks the reference window image in the input search window image based on a frequency domain background correction term that includes a 2 dimension sinc function, wherein the tracker:
   zero-pads a reference window to a size of a search window, performs a 2 dimension Fast Fourier Transform of the zero-padded reference window into the frequency domain, and takes a complex conjugate of the transformed zero-padded reference window;
   performs a 2 dimension Fast Fourier Transform of a search window;
   performs a complex multiplication of the complex conjugate of the transformed zero-padded reference window and the transformed search window, and multiplies the result by a first factor to obtain a first result in the frequency domain;
   obtains a search window function by squaring pixel values of the search window;
   performs a 2 dimension Fast Fourier Transform of the search window function into the frequency domain;
   multiplies the transform of the search window function with a sinc function to obtain a second result in the frequency domain;
   sums the first and second results to form a third result in the frequency domain;
   performs a 2 dimension inverse Fast Fourier Transform of the third result to obtain a spatial-domain correlation surface; and
   searches for a minimum of the correlation surface.

* * * * *